United States Patent
Luo

(10) Patent No.: US 12,227,361 B2
(45) Date of Patent: Feb. 18, 2025

(54) FLAT PACKING BELT

(71) Applicant: Zhejiang Youngsun Machinery Co., Ltd., Zhejiang (CN)

(72) Inventor: Bangyi Luo, Zhejiang (CN)

(73) Assignee: ZHEJIANG YOUNGSUN MACHINERY CO., LTD., Zhejiang (CN)

( * ) Notice: Subject to any disclaimer, the term of this patent is extended or adjusted under 35 U.S.C. 154(b) by 81 days.

(21) Appl. No.: 18/328,210

(22) Filed: Jun. 2, 2023

(65) Prior Publication Data

US 2024/0400308 A1   Dec. 5, 2024

(51) Int. Cl.
*B65G 15/32*  (2006.01)
*B65G 15/34*  (2006.01)
*B65G 15/42*  (2006.01)

(52) U.S. Cl.
CPC ............. *B65G 15/32* (2013.01); *B65G 15/34* (2013.01); *B65G 15/42* (2013.01)

(58) Field of Classification Search
CPC ......... B65G 15/32; B65G 15/34; B65G 15/42
USPC ...................................................... 198/846
See application file for complete search history.

(56) References Cited

U.S. PATENT DOCUMENTS

| 2,912,722 | A  | * | 11/1959 | Howell ............... | D01H 5/86 428/167 |
| 9,752,281 | B2 | * | 9/2017 | Manifold ............. | D21H 27/02 |
| 2002/0175055 | A1 | * | 11/2002 | Ryde .................. | B65G 15/42 198/690.2 |
| 2003/0138597 | A1 | * | 7/2003 | Ruthven ............. | A61F 13/15731 101/6 |
| 2022/0289487 | A1 | * | 9/2022 | Schroeder .......... | B65G 15/42 |

FOREIGN PATENT DOCUMENTS

JP         2019011861 A  *  1/2019  ............ B65G 15/42

\* cited by examiner

*Primary Examiner* — James R Bidwell
(74) *Attorney, Agent, or Firm* — MUNCY, GEISSLER, OLDS & LOWE, P.C.

(57) ABSTRACT

A flat packing belt includes a front face and a back face. The front face and the back face include same raised oblique-strip patterns, so that an oblique direction, an oblique angle and a distance between adjacent raised oblique-strip patterns of the raised oblique-strip patterns observed from an orthographic projection of the front face are the same as the oblique direction, the oblique angle and the distance between adjacent raised oblique-strip patterns of the raised oblique-strip patterns observed from the orthographic projection of the back face. By designing the same friction patterns on both the front face and the back face of the packing belt in opposite directions. The flat packing belt not only ensures large friction, but also ensures accurate belt moving during the process of manufacture. Therefore, production quality is ensured.

4 Claims, 5 Drawing Sheets

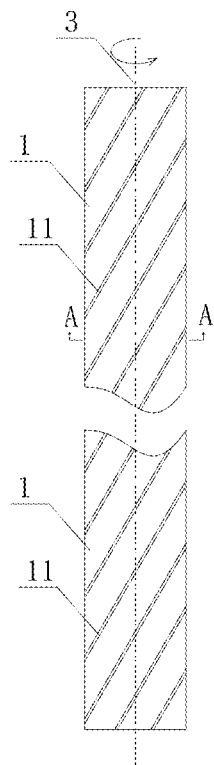 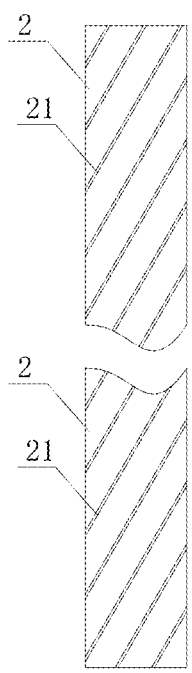 
FIG. 1      FIG. 2      FIG. 3
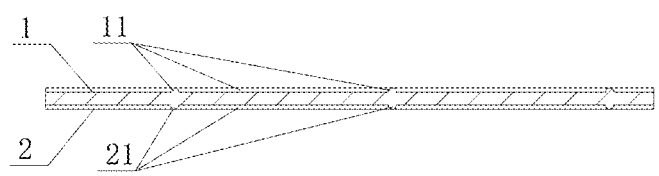
FIG. 4

FLAT PACKING BELT

TECHNICAL FIELD

This application relates to the technical field of a packing belt, and more particular, to a flat packing belt made of macromolecular compound such as polypropylene or polyethylene terephthalate and used for a packaging machine. The width of such packing belt with common size is in a range of 4-19 mm, and the thickness is in a range of 0.35-1 mm.

BACKGROUND

In order to increase friction, friction patterns are made on both the front face and the back face of a flat packing belt made of macromolecular compound such as polypropylene or polyethylene terephthalate and used for a packaging machine by rolling technology. The rolling operation includes continuous feeding and continuous rolling. Therefore, common friction patterns on both the front face and the back face are grid patterns so as to balance the force applied on the belt and ensure that the belt does not deviate. During the process of continuous feeding, the packing belt passes through the gap between two hot pressing rollers with recessed grid patterns on rollers' surfaces, and raised grid patterns are made on the front face and back face of the belt by hot pressing. Although such type of belt has large friction, the strength of the packing belt will be greatly reduced, which affects its tensile strength.

BRIEF SUMMARY

An object of the present application is to provide a flat packing belt that maintains large friction while meeting the requirement for belt moving during the process of manufacture. The present invention adopts the following technical solution.

A flat packing belt includes a front face and a back face. The front face and the back face are provided with same raised oblique-strip patterns, so that an oblique direction, an oblique angle and a distance between adjacent raised oblique-strip patterns of the raised oblique-strip patterns observed from an orthographic projection of the front face are the same as the oblique direction, the oblique angle and the distance between adjacent raised oblique-strip patterns of the raised oblique-strip patterns observed from the orthographic projection of the back face.

On the basis of adopting the above-mentioned technical solution, the present application can further adopt the following technical solutions, or adopt combination of these technical solutions.

A height of the raised oblique-strip pattern is in a range of 0.05-0.3 mm. A width of the packing belt is in a range of 4-19 mm, and a thickness is in a range of 0.35-1 mm.

The raised oblique-strip patterns are raised strips parallel with each other.

Raised oblique-strip patterns on both the front face and the back face of the flat packing belt are made by two parallel hot pressing rollers rotating in opposite directions with same recessed oblique-strip patterns. The flat packing belt is continuously fed through a gap between the two hot pressing rollers rotating in opposite directions, and raised oblique-strip patterns are made on the front face and the back face by hot pressing.

In this application, by designing the same friction patterns on both the front face and the back face of the packing belt in opposite directions, it not only ensures large friction, but also ensures accurate belt moving during the process of manufacture. Therefore, production quality is ensured. Meanwhile, the tensile strength of the belt is ensured as the rolling operation has a small impact on the strength of the belt, alternatively, it can reduce weight under the condition of keeping the same tensile strength, which saves materials and is beneficial for environmental protection.

BRIEF DESCRIPTION OF DRAWINGS

FIG. 1 is a main view of a flat packing belt of the present application;

FIG. 2 is a rear view of the flat packing belt of the present application;

FIG. 3 is a schematic view of an overall structure of the flat packing belt based on FIG. 1, with friction patterns on a back face showing as dashed lines;

FIG. 4 is a cross-sectional view along line A-A in FIG. 1;

DETAILED DESCRIPTION

Figure 6:
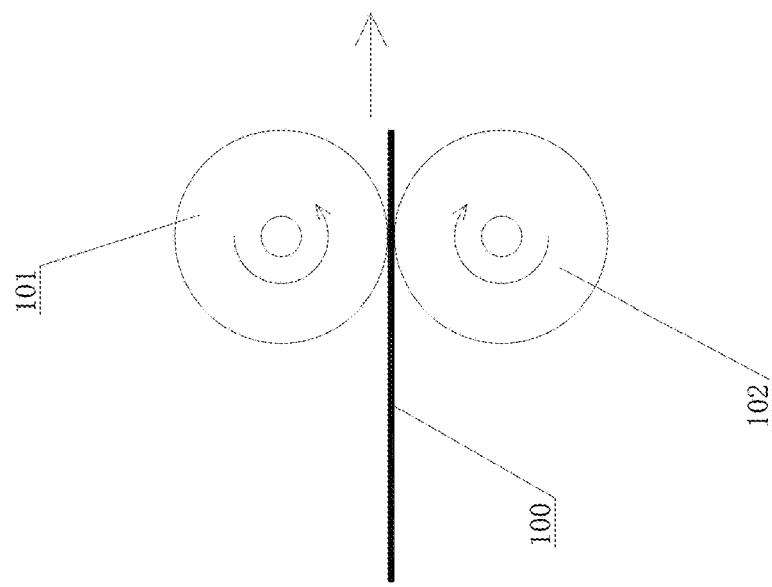
FIG. 6 is a side schematic view of rolling process.

Referring to the drawings, a flat packing belt referred to this application is a flat packing belt made of macromolecular compound such as polypropylene or polyethylene terephthalate and used for a packaging machine, and such packing belt can be bonded by hot melting during the process of packaging.

The width of the flat packing belt suitable for the packaging machine is in a range of 4.5±0.5 mm, and the thickness is in a range of 0.38±0.05 mm. This type of packing belt is taken as an example for detailed explanation in this embodiment, and the technical solution of this application can also be applied to packing belts with other sizes.

The flat packing belt includes a front face 1 and a back face 2 which are provided with same raised oblique-strip patterns. The raised oblique-strip pattern on the front face is marked as 11, and the raised oblique-strip pattern on the back face is marked as 21. Raised oblique-strip patterns on each of the faces are raised strips parallel with each other.

As shown in the drawings, an oblique direction, an oblique angle and a distance between adjacent raised oblique-strip patterns of the raised oblique-strip patterns 11 observed from an orthographic projection of the front face are the same as the oblique direction, the oblique angle and the distance between adjacent raised oblique-strip patterns of the raised oblique-strip patterns 21 observed from the orthographic projection of the back face. When the orthographic projection of the back face is to be observed, the flat packing belt with the front face facing toward the observer is rotated by 180° along an axis, the central line 3 of the packing belt in the width direction, so that the back face faces toward the observer. Therefore, although the raised patterns on each of the faces are oblique toward one direction, raised oblique-strip patterns on both the front face and back face appears a diamond or square shape. During the process of manufacture, it can not only avoid unnecessary extrusion and reduce the strength loss of the flat packing belt, but also ensure accurate belt moving without deviation through the coordination of the patterns on both the front face and the back face of the flat packing belt.

Figure 5:
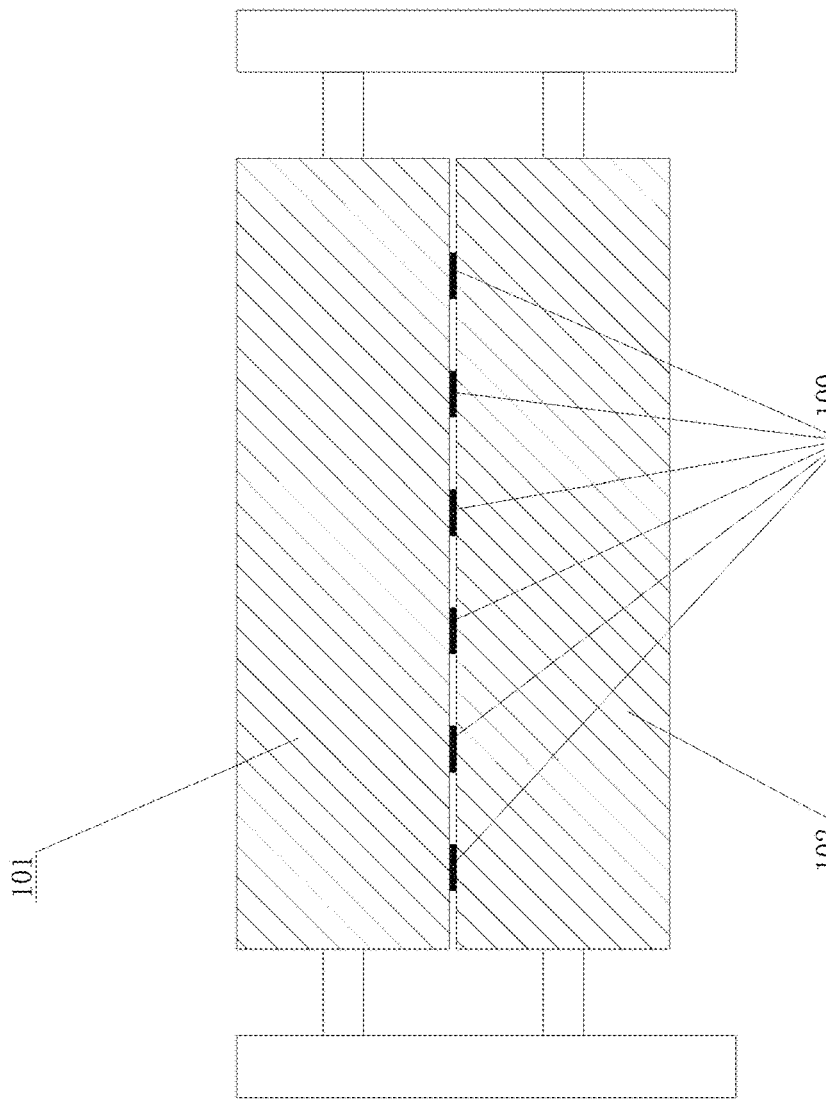
FIG. 5 is a main view of rolling equipment.

As shown in FIG. 5 and FIG. 6, manufacture equipment mainly includes two parallel hot pressing rollers 101,102 rotating in opposite directions with the same recessed oblique-strip patterns. The upper hot pressing roller 101 makes the raised oblique-strip patterns 11 on the front face, and the lower hot pressing roller 102 makes the raised oblique-strip patterns 21 on the back face. In fact, the upper hot pressing roller 101 and the lower hot pressing roller 102 can be two identical rollers. In FIG. 5 and FIG. 6, the rolled flat packing belt is marked as 100. The flat packing belt 100 is continuously fed through a gap between the two hot pressing rollers 101,102 rotating in opposite directions, and raised oblique-strip patterns 11,21 are made on the front face and the back face by hot pressing.

The density of the raised patterns of the flat packing belt is selected according to the size of the belt. In the case that the belt is thin and narrow, raised patterns are relatively narrow and small to ensure well-distributed raised patterns which achieves well-distributed friction. If wide and large patterns are pressed on the thin and narrow belt, it is easy to crush and damage the belt due to large patterns, what's more, it can also affect the appearance of the belt. In the case that the belt is thick and wide, raised patterns are relatively wide and large. Similarly, if narrow and small patterns are pressed on the thick and wide belt, the embossing will not be obvious, which will affect the friction and appearance of the packing belt.

During the process of usage, a belt feeding and belt retreating wheel of the packaging machine achieves belt feeding and belt retreating by friction force between the belt feeding and belt retreating wheel and the packing belt. When the belt is tensioned, a belt tensioning wheel achieves belt tensioning by the friction force between the belt tensioning wheel and the packing belt.

Figure 7:
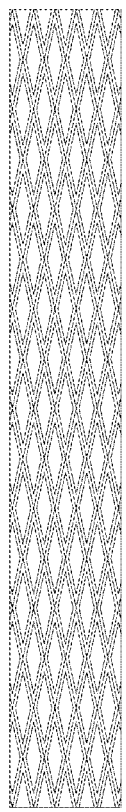
FIG. 7 is a main view of a flat packing belt of comparative embodiments.

FIG. 7 shows a flat packing belt of the prior art, with raised grid patterns on both the front face and the back face. According to conducted comparative experiments, under the condition that the flat packing belt keeps large friction which meets the requirement for the packaging machine and under the condition of keeping the same gram weight, there was no significant effect on changing the tensile strength when the density of the raised grid patterns of the flat packing belt was changed.

In the experiment, the tensile strength of the flat packing belt with the same raised oblique-strip patterns on both the front face and the back face is significantly higher than that of the flat packing belt with raised grid patterns on both the front face and the back face under the condition of ensuring large friction and accurate belt moving. It is further explained in combination with the records of the test and analysis as follow. The test was conducted according to QB/T 3811-199PP plastic packing belt. On the basis of ensuring smooth belt feeding and belt retreating, well-distributed friction, and non deformability of the belt, the value of the force at break per gram weight was calculated for comparison.

According to the above-mentioned embodiment of this application (referring to FIG. 1-FIG. 4) and the flat packing belt of the prior art (FIG. 7), a plurality of PP packing belts were manufactured by using the same packing belt rolling equipment in the same environment (with 4 specifications described as follow). A sample with the length of 5 m was taken from each flat packing belt according to the embodiment of this application (referring to FIG. 1-FIG. 4) and was weighted by using a JA103 electronic balance. Then the weight was divided by 5 to obtain the gram weight which was the weight per meter with the unit being g/m. A sample with the length of 5 m was taken from each flat packing belt of the prior art (FIG. 7) and was weighted by using the JA103 electronic balance. Then the weight was divided by 5 to obtain the gram weight which was the weight per meter with the unit being g/m.

The packing belt with the length of 5 m was divided into 10 sections, and the length of each section was 500 mm. The effective section with the length of 100 mm was in the middle of the belt. A SHK-A1014 tensile tester was used to conduct tensile tests on 10 samples, and 10 sets of values of the force at break were measured. The sum of the 10 sets of values of the force at break was divided by 10 to obtain the average value of the force at break of each sample, with the unit of the force at break being kgf.

The average value of the force at break was divided by the gram weight (that is, the weight per meter) to obtain the value of the force at break per gram weight, with the unit being kgf/g.

The specification of the packing belt was expressed in width*thickness (millimeter), and there were four specifications: 5*0.35 (comparative experiment 1), 8*0.4 (comparative experiment 2), 11*0.45 (comparative experiment 3), and 15.5*0.63 (comparative experiment 4). Several sets of samples with different embossing which were manufactured by using different embossing rollers on the packing belts with the same specification under the same production condition were compared.

Figure 8:
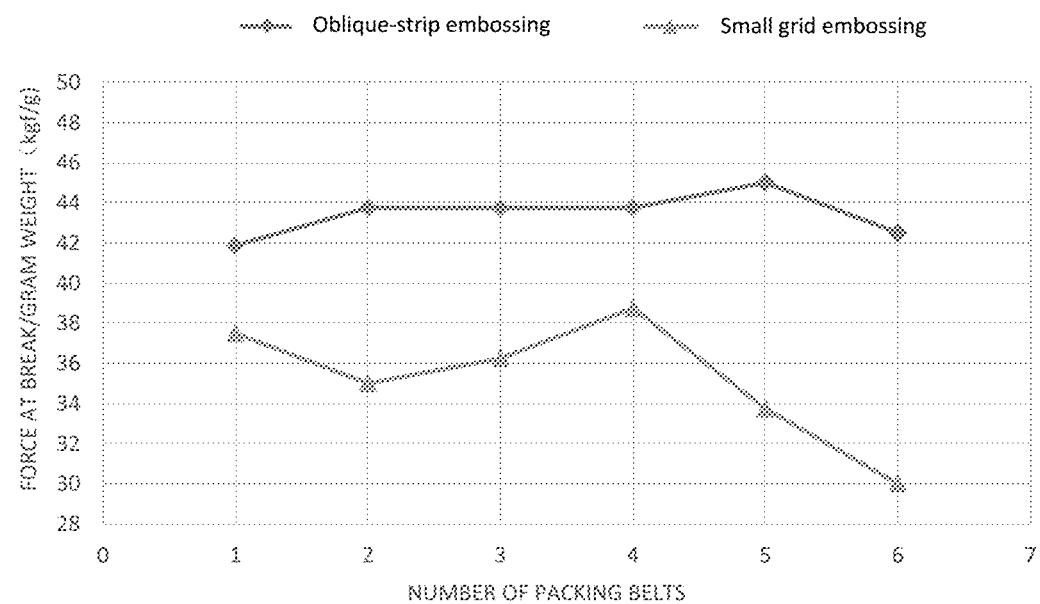
FIG. 8 is a comparison view between the flat packing belt of the prior art and a flat packing belt of the present application in Comparative Experiment 1.

As shown in FIG. 8, the test object was a flat packing belt with the specification of 5*0.35 and the gram weight of about 0.8 g/m. The horizontal axis represented the number n of several packing belts manufactured by the same equipment, and the vertical axis represented the value of the force at break per gram weight. Oblique-strip embossing referred to the flat packing belt of the present invention. Small grid embossing referred to the flat packing belt of the prior art shown in FIG. 7 (flat packing belt with raised grid patterns on both the front face and back face). From the drawing, it can be seen that the value of the force at break per gram weight of the flat packing belt with oblique-strip embossing was larger than that of the flat packing belt of the prior art with raised grid patterns on both the front face and back face, and the value of the force at break was increased by at least 10%.

Figure 9:
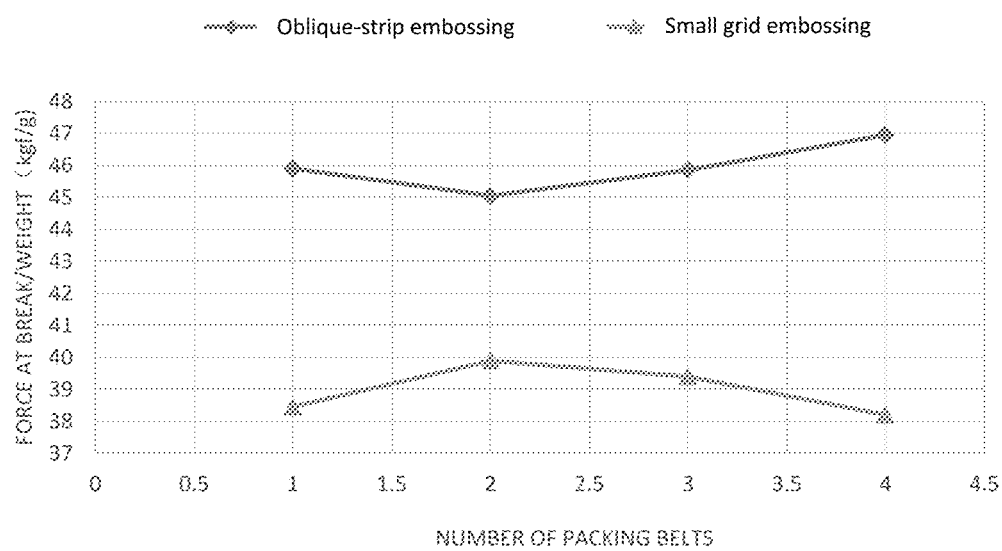
FIG. 9 is a comparison view between the flat packing belt of the prior art and a flat packing belt of the present application in Comparative Experiment 2.

As shown in FIG. 9, the test object was a flat packing belt with the specification of 8*0.4 and the gram weight of about 1.8 g/m. Oblique-strip embossing referred to the flat packing belt of the present invention. Small grid embossing referred to the flat packing belt of the prior art shown in FIG. 7 (flat packing belt with raised grid patterns on both the front face and back face). From the drawing, it can be seen that the value of the force at break per gram weight of the flat packing belt with oblique-strip embossing was larger than that of the flat packing belt of the prior art with raised grid patterns on both the front face and back face, and the value of the force at break was increased by at least 10%.

Figure 10:
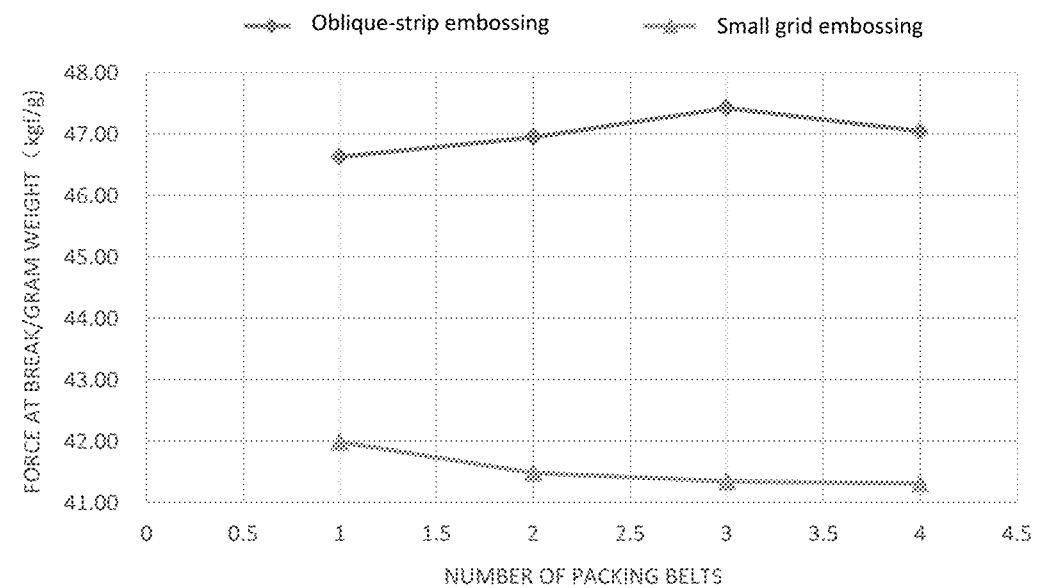
FIG. 10 is a comparison view between the flat packing belt of the prior art and a flat packing belt of the present application in Comparative Experiment 3.

As shown in FIG. 10, the test object was a flat packing belt with the specification of 11*0.45 and the gram weight of about 2.2 g/m. Oblique-strip embossing referred to the flat packing belt of the present invention. Small grid embossing referred to the flat packing belt of the prior art shown in FIG. 7 (flat packing belt with raised grid patterns on both the front face and back face). From the drawing, it can be seen that the value of the force at break per gram weight of the flat packing belt with oblique-strip embossing was larger than that of the flat packing belt of the prior art with raised grid patterns on both the front face and back face, and the value of the force at break was increased by at least 10%.

Figure 11:
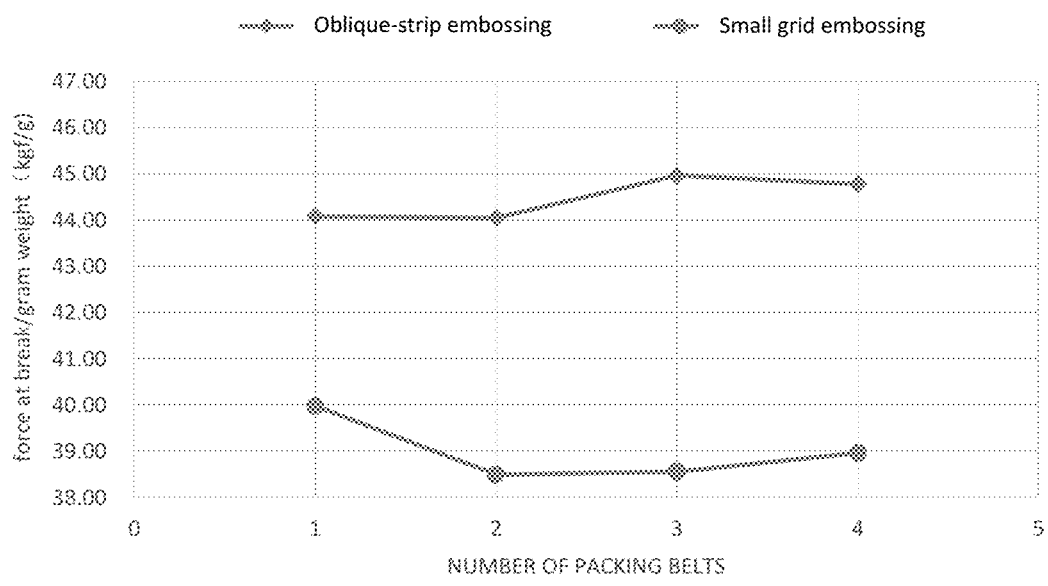
FIG. 11 is a comparison view between the flat packing belt of the prior art and a flat packing belt of the present application in Comparative Experiment 4.

As shown in FIG. 11, the test object was a flat packing belt with the specification of 15.5*0.63 and the gram weight of about 5.2 g/m. Oblique-strip embossing referred to the flat packing belt of the present invention. Small grid embossing referred to the flat packing belt of the prior art shown in FIG. 7 (flat packing belt with raised grid patterns on both the front face and back face). From the drawing, it can be seen that the value of the force at break per gram weight of the flat packing belt with oblique-strip embossing was larger than that of the flat packing belt of the prior art with raised grid patterns on both the front face and back face, and the value of the force at break was increased by at least 10%.

It can be concluded from the above-mentioned test that, under the condition of meeting the packaging machine, the tensile strength of the flat packing belt of this application is significantly higher than that of the conventional flat packing belt with raised grid patterns on both the front face and the back face without increasing the weight of the packing belt, which saves materials and is beneficial for environmental protection. What is provided above is merely some preferred embodiments of this application. The scope of this application is not limited by the above embodiments, but should includes all technical solutions under the thinking of this application. It is to be noted that, some improvements and modifications can be made by those skilled in the art without departing from the principle of this application, and should be considered to fall within the scope of this application.

What is claimed is:

1. A flat packing belt, comprising a front face and a back face, wherein the front face and the back face are provided with same raised oblique-strip patterns, so that an oblique direction, an oblique angle and a distance between adjacent raised oblique-strip patterns of the raised oblique-strip patterns observed from an orthographic projection of the front face are the same as the oblique direction, the oblique angle and the distance between adjacent raised oblique-strip patterns of the raised oblique-strip patterns observed from the orthographic projection of the back face.

2. The flat packing belt according to claim 1, wherein a height of the raised oblique-strip pattern is in a range of 0.05-0.3 mm.

3. The flat packing belt according to claim 1, wherein the raised oblique-strip patterns are raised strips parallel with each other.

4. The flat packing belt according to claim 1, wherein raised oblique-strip patterns on both the front face and the back face of the flat packing belt are made by two parallel hot pressing rollers rotating in opposite directions with same recessed oblique-strip patterns, the flat packing belt is continuously fed through a gap between the two hot pressing rollers rotating in opposite directions, and raised oblique-strip patterns are made on the front face and the back face by hot pressing.

* * * * *